United States Patent
Xu et al.

(10) Patent No.: US 10,638,400 B1
(45) Date of Patent: Apr. 28, 2020

(54) SYSTEMS AND METHODS OF OPTIMAL WIRELESS TRAFFIC ROUTING

(71) Applicant: Syniverse Technologies, LLC, Tampa, FL (US)

(72) Inventors: Huiyue Xu, Tampa, FL (US); Prashant Datar, Tampa, FL (US); Ravi Tandon, Sandweiler (LU)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/659,847

(22) Filed: Oct. 22, 2019

Related U.S. Application Data

(60) Provisional application No. 62/750,109, filed on Oct. 24, 2018.

(51) Int. Cl.
*H04W 40/12* (2009.01)
*H04W 24/10* (2009.01)
(Continued)

(52) U.S. Cl.
CPC ............. *H04W 40/12* (2013.01); *H04L 43/10* (2013.01); *H04L 43/12* (2013.01); *H04W 24/02* (2013.01); *H04W 24/10* (2013.01)

(58) Field of Classification Search
CPC ........ H04L 43/10; H04L 43/12; H04W 24/02; H04W 24/10; H04W 40/12
See application file for complete search history.

(56) References Cited

U.S. PATENT DOCUMENTS 7,328,262 B2 2/2008 McDonagh et al.
8,665,733 B2 3/2014 Eskicioglu et al.
(Continued)

FOREIGN PATENT DOCUMENTS

EP 2213060 B1 6/2011

OTHER PUBLICATIONS

"Managing Quality of Service, Security, Roaming Scenarios", Oct. 30, 2001, Retrieved from Internet (Google) XP00222504 pp. 15 (Year: 2001).*

(Continued)

*Primary Examiner* — Afsar M Qureshi
(74) *Attorney, Agent, or Firm* — Anton J. Hopen; Smith & Hopen, P.A.

(57) ABSTRACT

The specialized networking and application system includes an enforcer configured to intercept the signaling messages and select an optimal SGW, PGW, SMF/UPF and application servers in real time. More specifically, the enforcer intercepts and generates GSM MAP, Diameter, GTP-C and HTTP2/JSON signaling messages. The enforcer executes a policy to force the user devices to re-establish the data connection, thus anchoring at different SGW, PGW, SMF/UPF and application server to keep end-to-end routing path optimal, when the impacting factor changes. The enforcer can further feed its performance data and decision matrix into the analyzer and database to further optimize the decision process. Analyzer and KPI metrics databases are installed at central data centers to collect the KPI data from different probes and enforcer, calculate in real-time the optimal routing path with different decision factors considered, and interact with enforcer to update the latest optimal path status based on the data collected.

20 Claims, 15 Drawing Sheets

(51) Int. Cl.
*H04L 12/26* (2006.01)
*H04W 24/02* (2009.01)

(56) References Cited

U.S. PATENT DOCUMENTS

| | | | |
|---|---|---|---|
| 8,699,359 B2 | 4/2014 | Eskicioglu et al. | |
| 9,973,395 B2 | 5/2018 | Shaw et al. | |
| 2007/0019955 A1* | 1/2007 | Mitra | H04L 12/14 |
| | | | 398/66 |
| 2009/0028062 A1* | 1/2009 | Meloche | G06Q 40/00 |
| | | | 370/252 |
| 2017/0367036 A1* | 12/2017 | Chen | H04L 43/08 |
| 2018/0295045 A1 | 10/2018 | Bali et al. | |
| 2019/0149977 A1* | 5/2019 | Seenappa | H04W 28/08 |
| | | | 370/331 |
| 2019/0373441 A1* | 12/2019 | Ryu | H04W 68/005 |

OTHER PUBLICATIONS

Technical Specification Group Radio Access Network; Measurements of Radio Performances for UMTS Terminals in Speech Mode (Release 11), 3GPP TR 25.914V11.0.0 Technical Report, (Dec. 2011), 2011, 3GPP Organizational Partners, pp. 1-82. (Year: 2011).*

* cited by examiner

SYSTEMS AND METHODS OF OPTIMAL WIRELESS TRAFFIC ROUTING

PRIORITY CLAIM

This non-provisional application claims priority to a U.S. Provisional Application having Ser. No. 62/750,109 filed on Oct. 24, 2018.

BACKGROUND OF THE INVENTION

1. Field of the Invention

This invention relates generally to the field of wireless data communication networks, specifically to the mobile packet core network in the General Packet Radio Service (GPRS), 3G network, the Evolved Packet Core (EPC) of the Long-Term Evolution (LTE) network, and 5G Networks.

More particularly, the technology herein relates to computer systems and processes that measure the end-to-end latency from device to application servers and direct the mobile network core systems to route the traffic using an optimal traffic routing path.

2. Brief Description of the Related Art

In the prior art wireless data communication systems, a data session is setup between the user equipment (UE) and core network systems. The user equipment and application traffic are routed between the UE and the application servers through the Serving GPRS Support Node (SGSN) and/or serving gateway (SGW) and the Gateway GPRS Support Node (GGSN) and/or Packet Data Network Gateways (PGW), different network routers and firewalls, private networks or public Internet.

The routing path described above is not optimal from an end-to-end aspect. The SGSN/SGW selects the GGSN/PGW based on the mobile operator's domain name system (DNS) resolution according to current 3rd Generation Partnership Project (3GPP) specifications. The GGSN/PGW routes the application traffic towards the application servers based on its available network connections. Such hop-by-hop network routing decision does not provide the optimal routing from the end-to-end point of view.

This problem is further exacerbated in the context of international roaming. The current practice is that the traffic is tunneled in the GPRS Tunneling Protocol (GTP) and sent from the visited network's SGSNS/GW towards home network's GGSN/PGW. There could be multiple international links between visited network's SGSN/SGW towards home network's GGSN/PGW, and each link can have quite different latency and throughput. If one link becomes unavailable, the traffic is switched to the other links, which can cause the existing traffic path to no longer be the optimal one. Certain home network operators deploy GGSN/PGW at regional Points of Presence (POPs) serving traffic from different visited operators to facilitate more efficient traffic routing. However, with the multiple connection links, in some circumstances, it may be more optimal to switch to another GGSN/PGW in case the existing link is not available.

In 5G systems, the network slice consists of, among other Network Functions (NFs), Session Management Function (SMF) for session management and User Plane Function (UPF) for bearer traffic routing. The Access Management Function (AMF) could be common across various slice-types. Slice selection is performed between the Radio Access Network (RAN), 5G base-station (gNB) and AMF based on pre-configured requirements related to Quality of Service (QoS). The Network Slice Selection Function (NSSF) assists the AMF with this selection.

Multiple instances of each slice-type could be implemented in geographically distributed locations. An optimal selection of one such instance of a slice per session is desirable so as to afford the lowest network latency in addition to an even distribution of the session-load across the network.

Moreover, the application servers can be deployed at different locations and the network latency and quality between the GGSN, PGW or SMF/UPF and applications could be varied when accounting for the different network routing combinations.

This invention reveals the methods and systems for mobile operator to periodically monitor and measure the end-to-end network quality, and dynamically update the GGSN, PGW or SMF/UPF anchor point (slice instance) for user devices, to achieve the optimal end-to-end routing path based on the device location and the application server location.

SUMMARY OF THE INVENTION

This invention pertains to a specialized networking and application system. The specialized networking and application system includes an enforcer application configured to intercept the signaling messages and select an optimal SGW, PGW, SMF/UPF and application servers in real time. More specifically, the enforcer intercepts and generates GSM Mobile Application Part (MAP), Diameter, GTP-C and HTTP2/JSON signaling messages. The enforcer executes a policy to force the user devices to re-establish the data connection, thus anchoring at different SGW, PGW, SMF/UPF and Application Server to keep end-to-end routing path optimal, when the impacting factor changes. The enforcer can further feed its performance data and decision matrix into the analyzer and database to further optimize the decision process.

An embodiment includes exemplified analyzer and key performance indicator (KPI) metrics databases installed at central data centers, to collect the KPI data from different probes and enforcer, calculate in real-time the optimal routing path with different decision factors considered, and interact with enforcer to update the latest optimal path status based on the data collected.

The embodiment includes multiple probes installed in different locations along with the GGSN, PGW or SMF/UPF to periodically and proactively test the network quality with the user devices and the application servers, detect the network quality change event, and feed into the analyzer and KPI metrics database to do further analysis. The exemplified probes collects data feeds from different sources including the latest Application Servers IP addresses, the latest SGSN/SGW or visited SMF/UPF list to dynamically update its monitoring list. Optionally it collects the user equipment network latency info from a deep packet inspection (DPI) platform or GGSN/PGW or SMF/UPF system and reports to provide more granularity device quality.

An embodiment of the invention includes a method of optimizing end-to-end routing in cellular networks (GPRS and 5G). A network probe communicates within the cellular network. The probe has sufficient network authorization and authority to send and receive (e.g., intercept) signaling messages between network peers such as server gateways (SGW), packet data network gateways (PGW), gateway GPRS support nodes (GGSN), server GPRS support nodes (SGSN), session management function (SMF) nodes and user plane function (UPF) nodes. The probe transmits over a time-based interval an echo-request to a first network peer wherein the connection from the probe to the first network peer constitutes a first network path. The probe then receives from the first network peer an echo-response. Within a key performance indicator (KPI) metrics database is stored at least one performance value for the first network path. Performance values may include those derived from connection latency, packet loss, network bandwidth, network availability, application throughput, network cost and hosting cost. For comparison, the probe transmits over the time-based interval an echo-request to a second network peer, the second network peer being a functionally equivalent node to the first network peer (e.g. a second SGSN or second GGSN). The connection from the probe to the second network peer constitutes a second network path and the probe receives from the second network peer an echo-response. The results are then stored in the KPI metrics database. The results include at least one performance value for the second network path from the probe for the second network peer.

Responsive to a connection event which may be a new connection request by user equipment or a change in the KPI metrics database, the KPI metrics database is queried for an optimal network path based at least in part on the performance values for the first and second network paths. An optimal network path for the user equipment device is received and a signaling message is generated to force the user equipment device to reestablish its data connection to the received optimal network path. The signaling message is transmitted to the user equipment device.

This embodiment may be deployed on a variety of cellular networks including third generation (3G) networks, long-term evolution (LTE) networks and fifth-generation (5G) networks.

The echo request may be a GPRS tunneling protocol (GTP-C) message or a GPRS tunneling protocol (GTP-U) message.

The probe may generate heartbeat queries on a first interval to network peers and stores heartbeat responses in the KPI metrics database. Responsive to non-receipt of a heartbeat response based on a predetermined threshold timespan, the probe may update the KPI metrics database with the non-receipt and generate heartbeat queries on a second interval to the network peers, the second interval shorter than the first interval.

To determine optimal application server targets, the probe may generate hypertext protocol (HTTP) GET requests to application servers within the cellular network and store the HTTP responses in the KPI metrics database.

The connection request message may be an activate packet data protocol (PDP) context request received from the user equipment device through a first serving node as a GTP-C create session request message to connect to a first external gateway. Additional steps to this embodiment may include querying the KPI metrics database, identifying a second external gateway having a higher performance value than the first external gateway, issuing a GTP-C create session request to the second external gateway, receiving a GTP-C create session response from the second external gateway, and transmitting a GTP-C create session response to the first serving node which then transmits an activate PDP context accept message to the user equipment device whereby the user equipment device connects to the higher-performing second external gateway.

In an embodiment of the invention, the connection request message is an activate session request received from the user equipment device through a first serving node as a context setup request message to connect to a first external gateway. This embodiment may include additional steps such as querying the KPI metrics database, identifying a second external gateway having a higher performance value than the first external gateway, issuing a context setup request to the second external gateway, receiving a context setup response from the second external gateway, and transmitting a context setup response to the first serving node which then transmits an activate accept message to the user equipment device whereby the user equipment device connects to the higher-performing second external gateway.

The connection request message may be a GPRS Mobility Management (GMM) attach request received from the user equipment device through a first serving node as a first location update message, which includes additional steps of querying the KPI metrics database, identifying a second serving node having a higher performance value than the first serving node, and issuing a location update reject message back to the first serving node and signaling to the user equipment device to generate a GMM attach request to the second serving node whereby the user equipment device connects to the higher-performing second serving node.

In yet another embodiment of the invention, the connection request message is a HTTP request received from the user equipment device through a first serving node to a first application server. The steps include querying the KPI metrics database, identifying a second application server having a higher performance value than the first application server, and signaling to the user equipment device to update the uniform resource locator from the first application server to the second application server whereby the user equipment device connects to the higher-performing second application server.

As a system, the invention includes components such as analyzers and enforcers. Such a system includes a network probe software application communicatively coupled to the cellular network, the probe having network authorization and authority to send and receive signaling messages to network peers. The probe transmits over a time-based interval an echo-request to a first network peer wherein the connection from the probe to the first network peer constitutes a first network path. The probe receipts from the first network peer an echo-response. Within a key performance indicator (KPI) metrics database is stored at least one performance value for the first network path from the probe for the first network peer derived from the group consisting of latency, packet loss, network bandwidth, network availability, application throughput, network cost and hosting cost, The probe also transmits over the time-based interval an echo-request to a second network peer, the second network peer being a functionally equivalent node to the first network peer, wherein the connection from the probe to the second network peer constitutes a second network path. The probe receives from the second network peer an echo-response and within the the KPI metrics database is stored at least one performance value for the second network path. An analyzer application communicatively coupled to the cellular network and KPI metrics database is provided. The analyzer contains logic to identify the optimal end-to-end network pathways. Responsive to a connection event, the KPI metrics database is queried for an optimal network path based at least in part on the performance values for the first and second network paths. The query results are returned to the analyzer whereby the optimal end-to-end network pathway is identified by the analyzer. An enforcer application is provided which is communicatively coupled to the cellular network and analyzer. The enforcer generates a signaling message to force the user equipment device to reestablish its data connection to the optimal network path identified by the analyzer. Finally, the enforcer transmits the signaling message to the user equipment device whereby the user equipment device reestablishes its data connection to the optimal network path.

In an embodiment, the system intercepts signaling messages from one or more network peers on the cellular network, checks the messages against the KPI metrics database to determine if the messages establish or maintain an optimal network path and responsive to the analyzer determining a better network path is available, the enforcer generates signaling messages directed to the user equipment device to reestablish its data connection to the optimal network path.

In yet another embodiment of the invention, the system monitors the KPI metrics database for changes in optimal network pathways and responsive to such changes, invokes the enforcer to generate signaling messages directed to the user equipment device to reestablish its data connection to the newly identified optimal network path. The KPI metrics database may be polled at various intervals such between 5 and 60 minutes for changes in optimal network pathways. The enforcer may generate a signaling message to direct to the user equipment device to reestablish its data connection to a new network path only if a threshold performance improvement delta exists. For example, if only a slight improvement in latency is detected on a secondary GGSN it may not be worth it to signal the user equipment device to disconnect from the current GGSN to reestablish a connection with the second GGSN.

Formats and protocols for the signaling messages generated by the enforcer may include, but are not limited by, global system for mobile communication (GSM), mobile application part (MAP), Diameter, GTP-C and JavaScript object notation. User equipment latency information may also be retrieved from deep packet inspection.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

Figure 1:
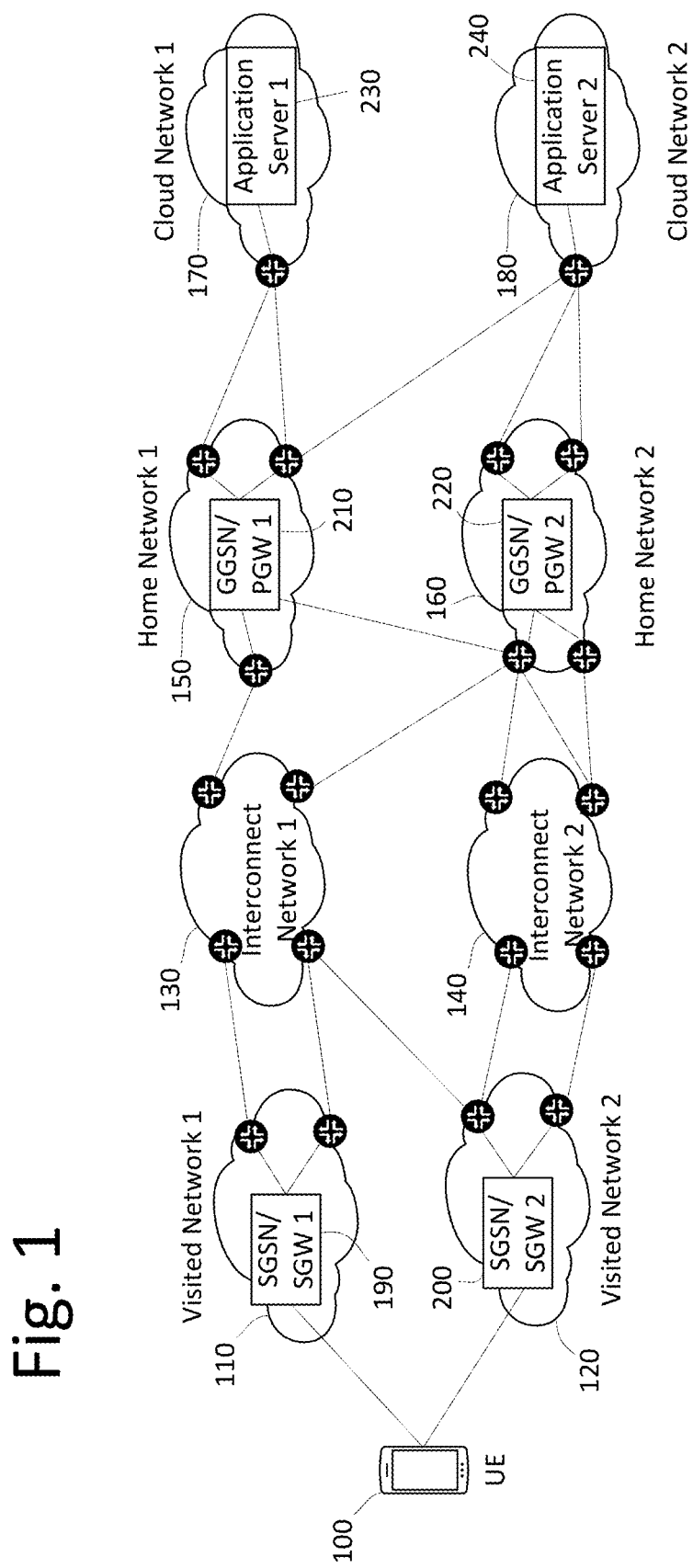
FIG. 1 is a block diagram schematically depicting the network connection diagram in a distributed computing environment.

FIG. 1 depicts an example of a network connection diagram in a distributed computing environment. User equipment (UE) 100 connects with visited network one 110 wherein SGSN/SGW one 190 carries UE 100's subscriber data through interconnect network one 130 to GGSN/PGW one 210 on home network one 150. GGSN/PGW one 210 connects to application server one 230 on cloud network one 170. UE 100 may also connect to SGSN/SGW two 1120 on visited network two 120. SGSN/SGW two 200 may connect either to GGSN/PGW one 210 or GGSN/PGW two 220 on home network one 150 or home network two 160. Application server two 240 is also accessible from GGSN/PGW one 210 or GGSN/PGW two 220.

Figure 2:
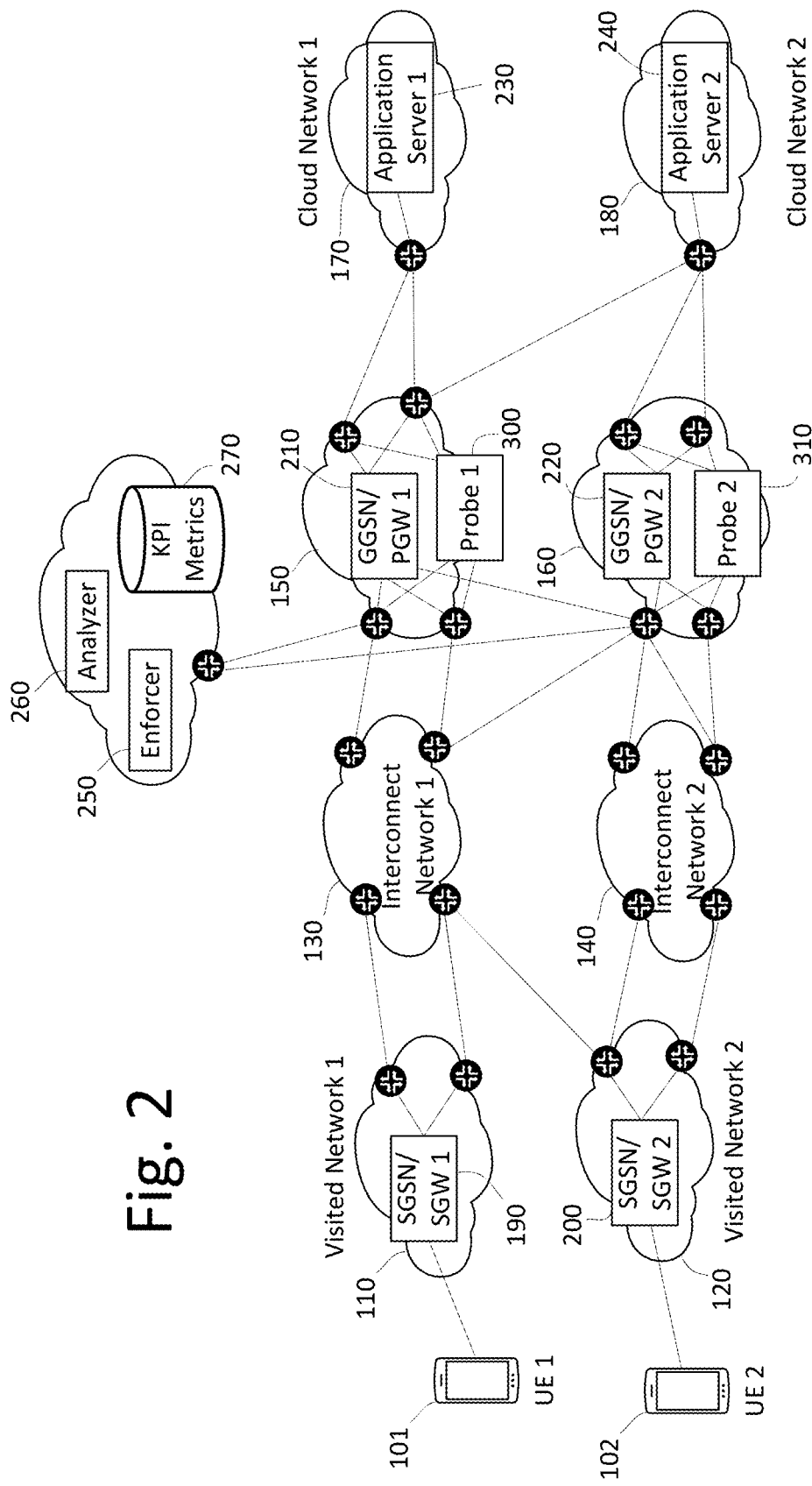
FIG. 2 is a block diagram schematically depicting one embodiment solution architecture of the present invention.

An example of architecture of the specialized network system according to some embodiments is depicted in FIG. 2. The enforcer 250 is a signaling proxy implementing the GSM MAP, Diameter and GTP-C signaling protocols as specified by the 3rd Generation Partnership Project (3GPP). The enforcer 250 remains in the network path for the duration of the signaling transaction or session. On receipt of a connection creation request, the enforcer 250 also queries the analyzer 260 with subscriber identity, APN, visited network, requested quality of service (QoS) and any available location information. The result of the query is the identity of the optimal gateway for the current network conditions. The sessions for UE one 101 and UE two 102 are steered by the enforcer 250 towards this gateway.

In a 5G system, the enforcer is a HTTP2/JSON protocol proxy that terminates the security association from the serving network and has a separate security association with the gateway nodes. Thus, the enforcer has access to all signaling information elements, any of which could be used to make optimal routing decisions.

Figure 4:
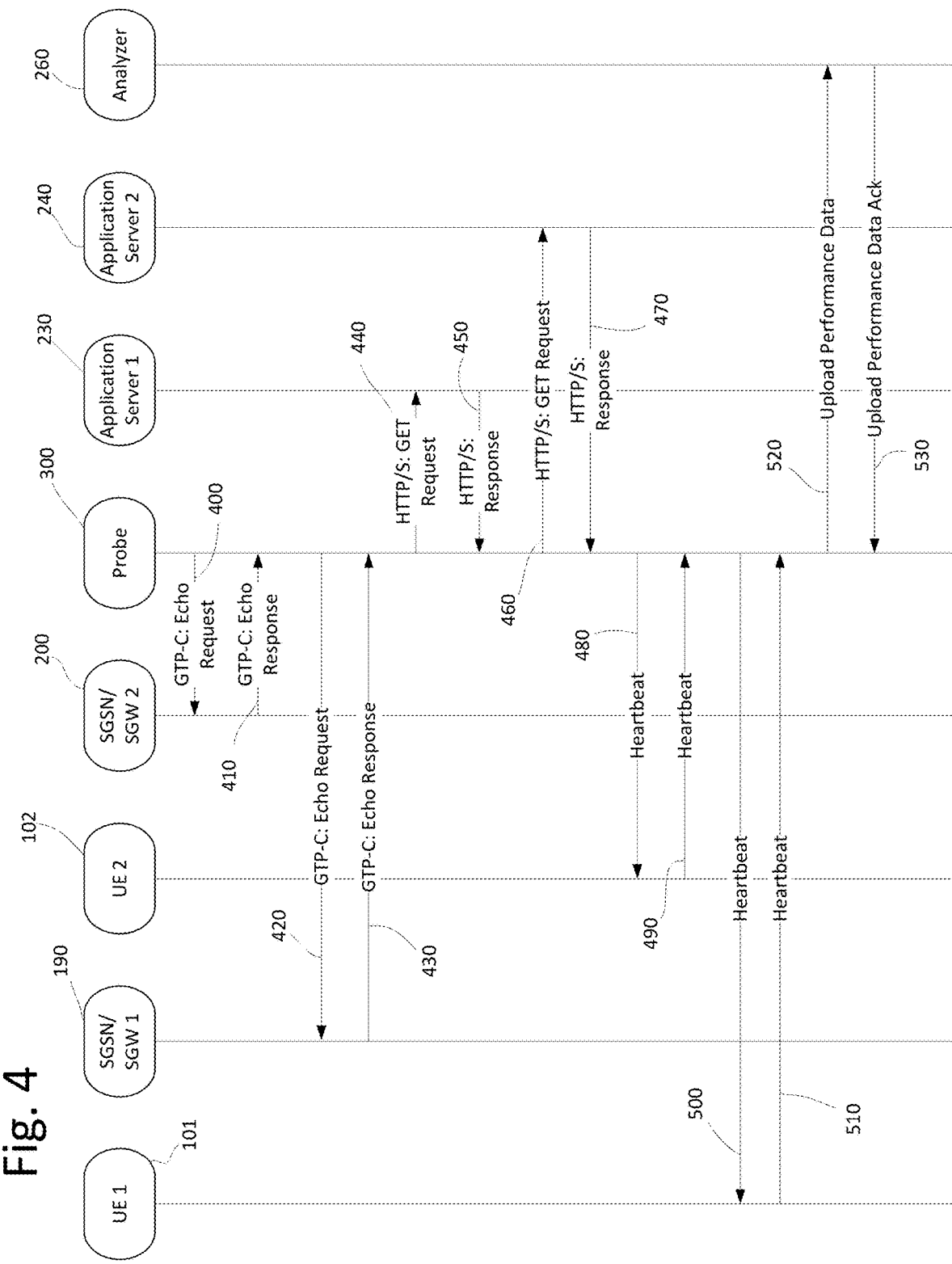
FIG. 4 is a sequential diagram depicting the exemplified probe monitor the network quality with different components.

The probe (300 in FIG. 4) is an application that initiates GTP-C echo-request messages, GTP-U echo-request messages and HTTP GET messages to measure network performance and latency. The per-target frequency at which these requests are sent is provisioned into the probe application 300. On receipt of the responses to such requests, the peer information, protocol information and round-trip-delay information is stored into the KPI metrics database 270 for latency analysis and optimal path selection by the analyzer 260. An example of a signaling flow is depicted in FIG. 4. GTP-C echo request 400 is sent from probe 300 to SGSN/SGW two 200. SGSN/SGW two 200 sends back a GTP-C echo response 410. Probe 300 then sends a GTP-C echo request 420 to SGSN/SGW one 190 and receives back a GTP-C echo response 430. Probe 300 then sends a HTTP request 440 to application server one 230 and gets back response 450. Probe also sends HTTP request 460 to application server two 240 and receives response 470. Probe 300 sends heartbeat queries 480 and 500 to UE two and UE one respectively and receives back heartbeat replies 490 and 510. Probe then uploads the performance and latency data 520 to analyzer 260 which acknowledges receipt 530.

Figure 3:
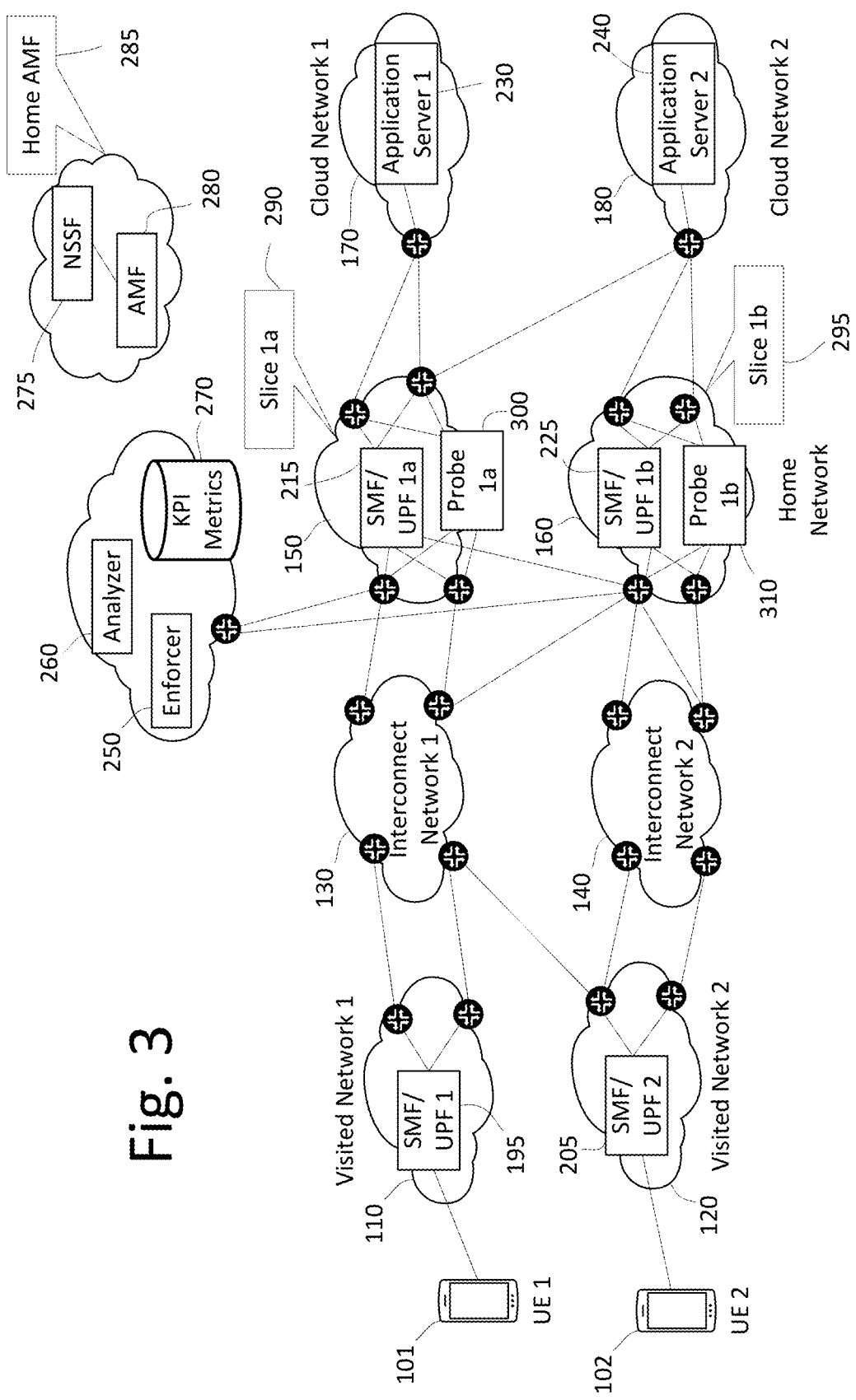
FIG. 3 is a block diagram schematically depicting one embodiment solution architecture of the present invention in a 5G system.

FIG. 3 depicts an example of the specialized network system architecture for 5G Home Routed solution. As described above, in a 5G system, the network slice includes, among other NFs, SMF for session management and UPF for bearer traffic routing (195, 205, 215 and 225). The AMF 280 could be common across various slice-types. Slice selection is performed between the RAN, 5G base-station and AMF based on pre-configured requirements related to QoS. The NSSF 275 assists the AMF 280 with this selection.

Figure 5:
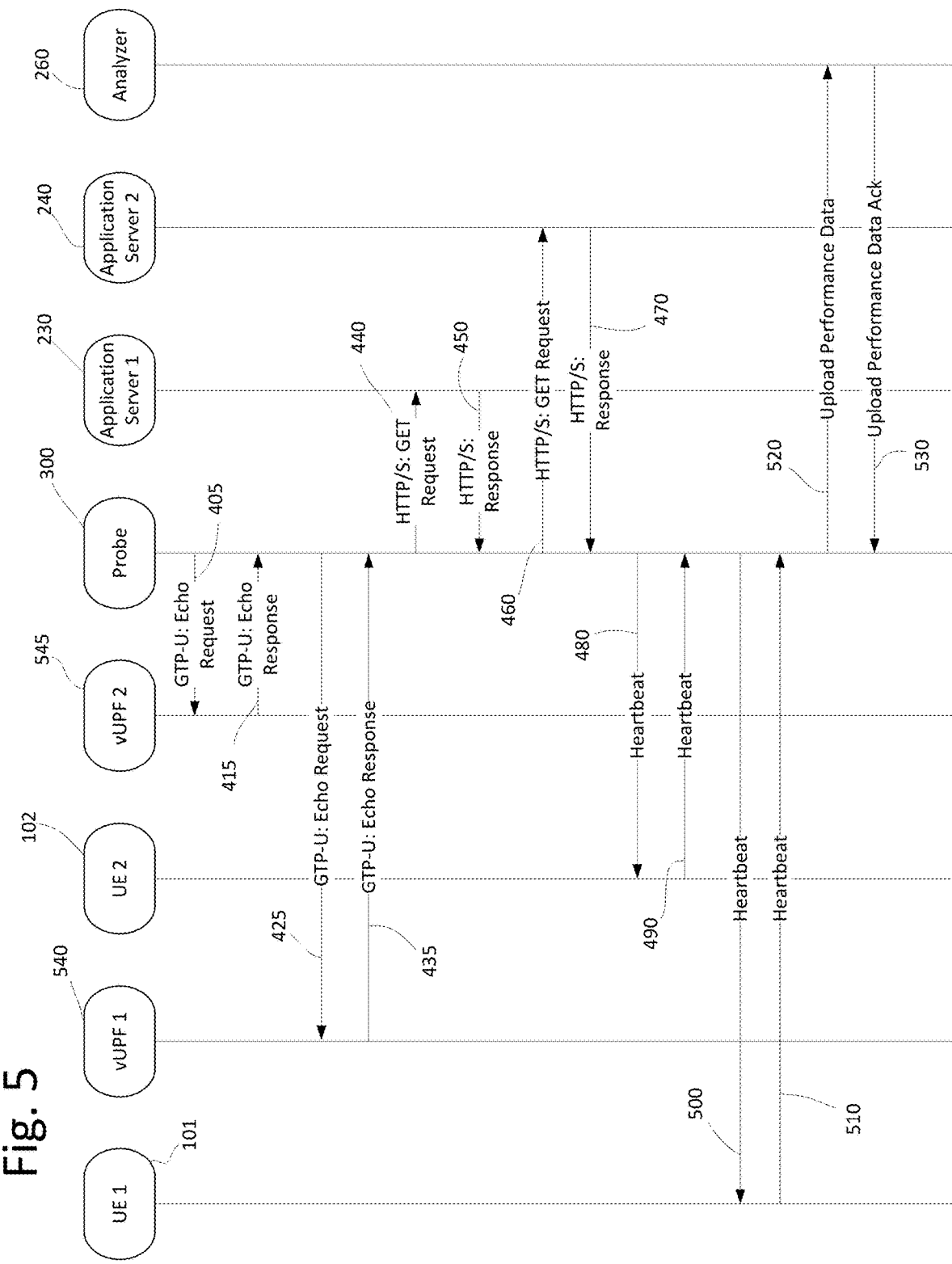
FIG. 5 is a sequential diagram depicting the exemplified probe monitor the network quality with different components in a 5G system.

FIG. 5 depicts an example signaling flow for measuring performance of a routing path according to this embodiment wherein probe 300 sends a GTP-U echo request 405 to vUPF two 545 which sends response 415. Probe 300 sends a GPU-U echo request 425 to vUPF one 540 which also sends response 435 thereby giving probe 300 a comparison of performance including latency. Probe 300 sends a HTTP GET request 440 to application server one 230 which responds 450. For comparison, probe 300 sends another HTTP GET request 470 to application server two 240 which responds 470. Probe 300 sends heartbeat queries 480 and 500 to vUPF two 545 and vUPF one 540 respectively which, in turn send responses 490 and 510. The performance data collected by probe 300 is uploaded 520 to analyzer 260 which acknowledges 530 receipt.

Figure 6:
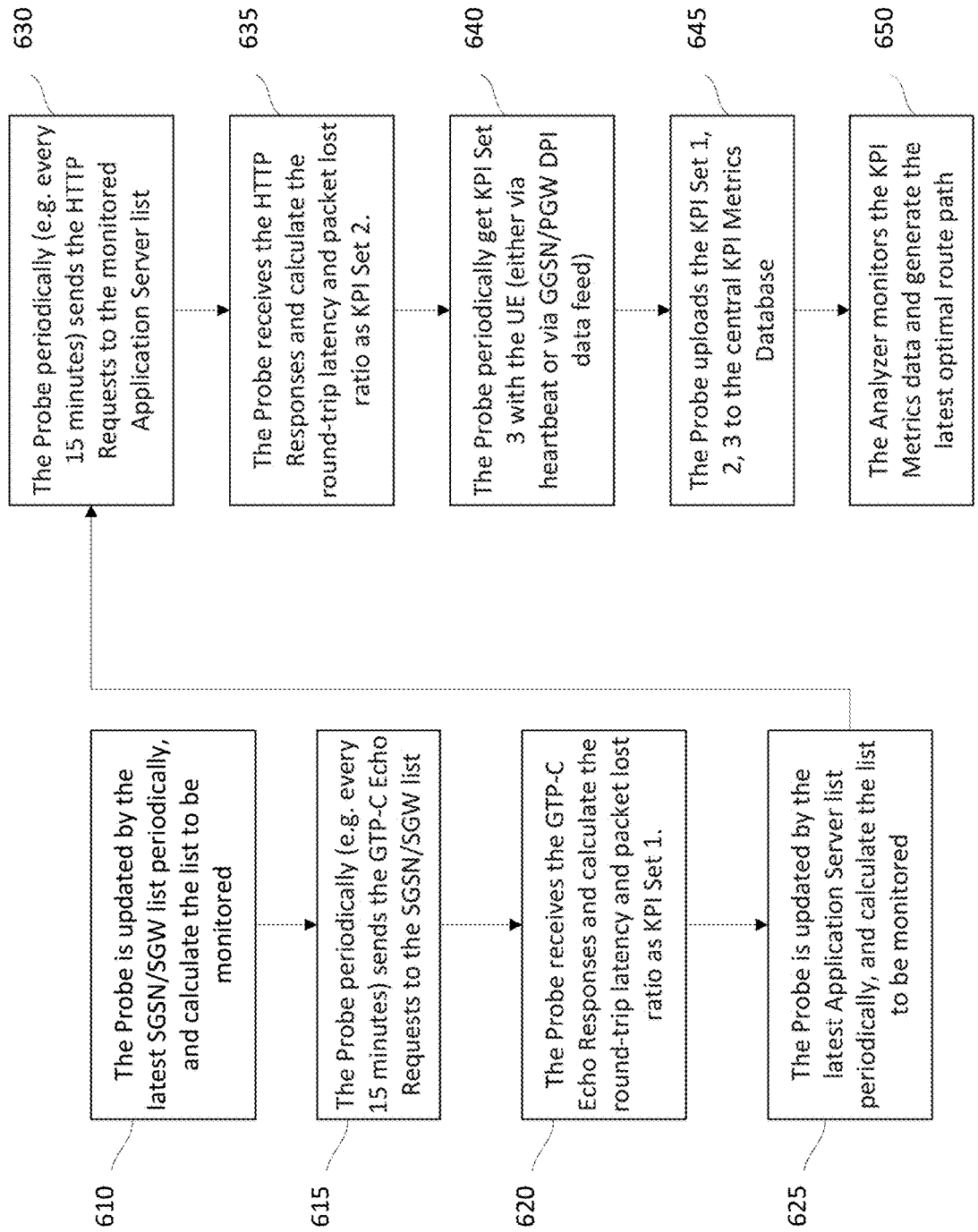
FIG. 6 is a block diagram schematically depicting the process inside the probe to monitor and collect the network quality metrics from different components.

Referring to the flowchart of FIG. 6, in an embodiment of the invention, the probe 300 is periodically updated 610 with the latest SGSN/SGW list. Probe 300 determines the list to be monitored. The probe periodically sends GTP-C Echo Requests to SGSN/SGW list and receives GTP-C Echo Responses from the SGSN/SGW 615. The probe calculates latency and packet loss ratio as KPI Set 1 620 using the Echo Requests and Responses. The probe is also periodically updated 625 with the latest Application Server lists and determines the list to be monitored. The probe periodically sends HTTP Requests 630 to the monitored Application Server list and receives the HTTP Responses thereto. The probe calculates the round-trip latency and packet loss ratio as KPI Set 2 635 based on the HTTP Requests and Responses. The probe also receives KPI Set 3 640 from the UE—either via GGSN/PGW DPI data feed or heartbeat signaling. The probe uploads KPI Sets 1, 2, and 3 645 to the central KPI metrics database. The analyzer monitors the KPI metrics data 650 and determines the latest optimal routing path based on those metrics.

Figure 7:
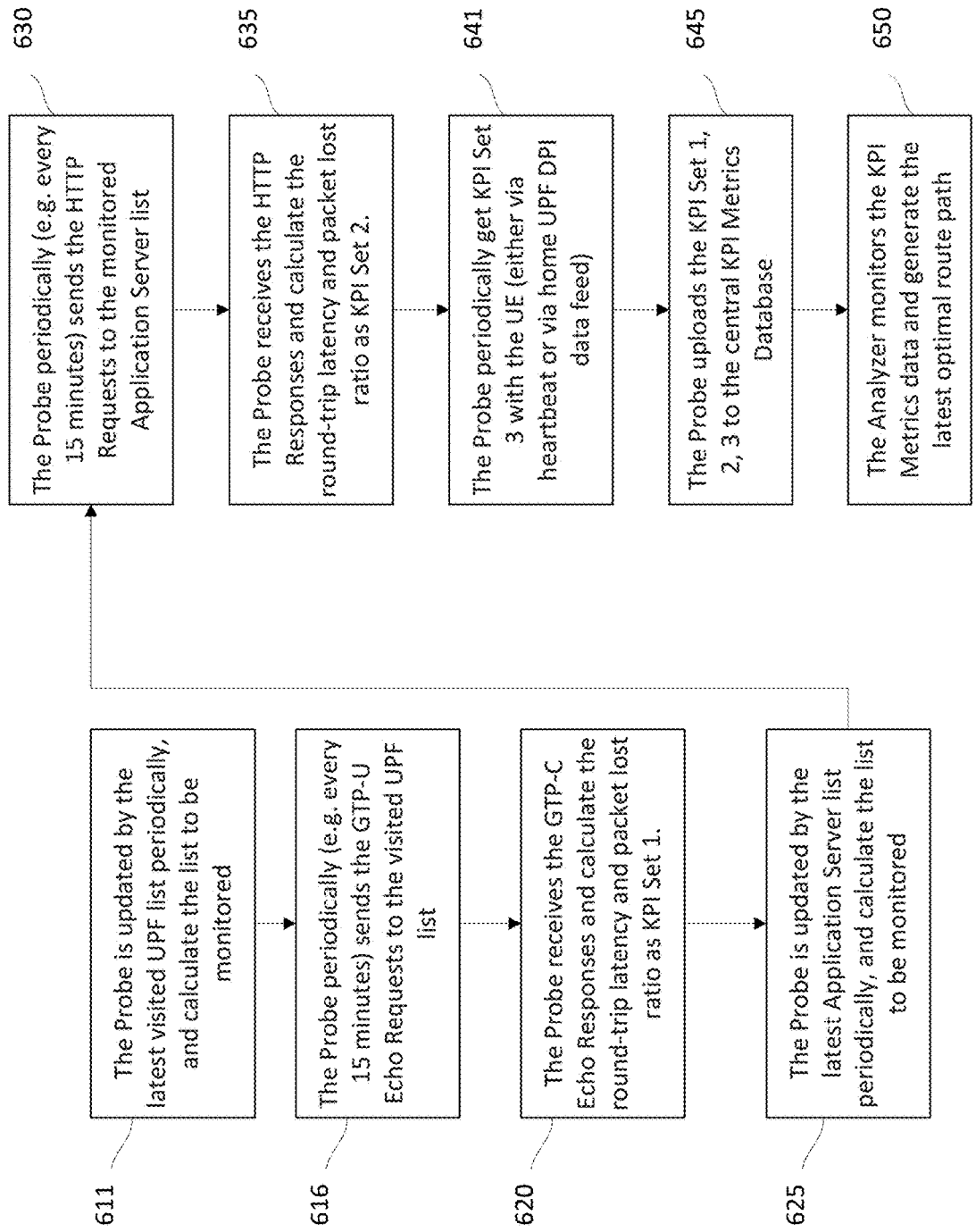
FIG. 7 is a block diagram schematically depicting the process inside the probe to monitor and collect the network quality metrics from different components in a 5G system.

FIG. 7 depicts the flowchart for an embodiment pertaining to 5G Home Routed scenario. This embodiment is similar to the one depicted in FIG. 6 and described above, except that the probe is updated with latest UPF list 616, rather than the latest SGSN/SGW and uses GTP-U Echo Requests and Response 616 and 620 sent to and received from the UPF list, rather than SGSN/SGW to determine round-trip latency and packet loss ratio 620 for KPI Set 1. The remaining steps of generating the optimal route paths are similar across the two embodiments.

Figure 8:
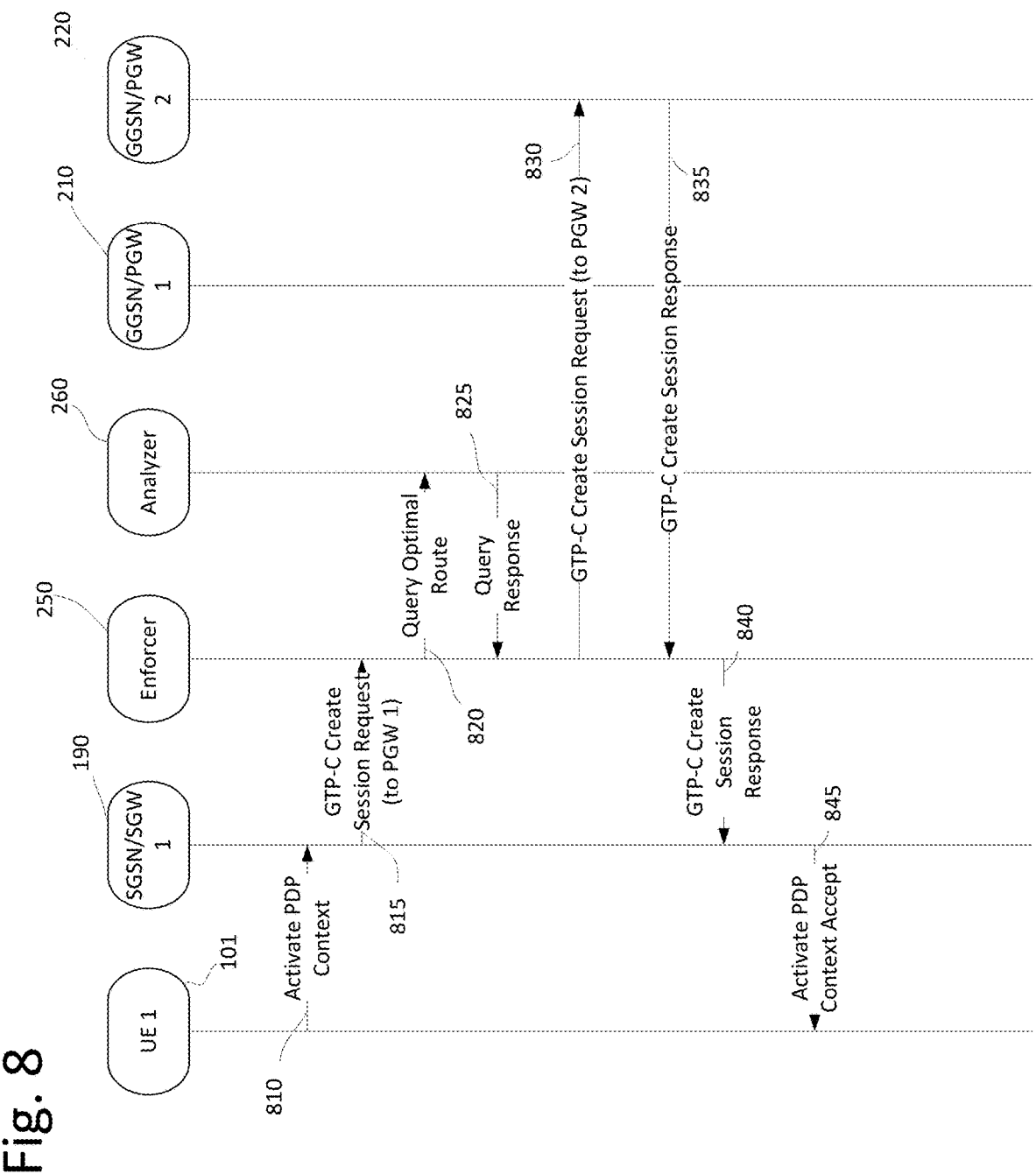
FIG. 8 is a sequential diagram depicting the PGW Selection procedure during session setup process in which the session is anchored at a different GGSN/PGW based on the analyzer result.
Figure 9:
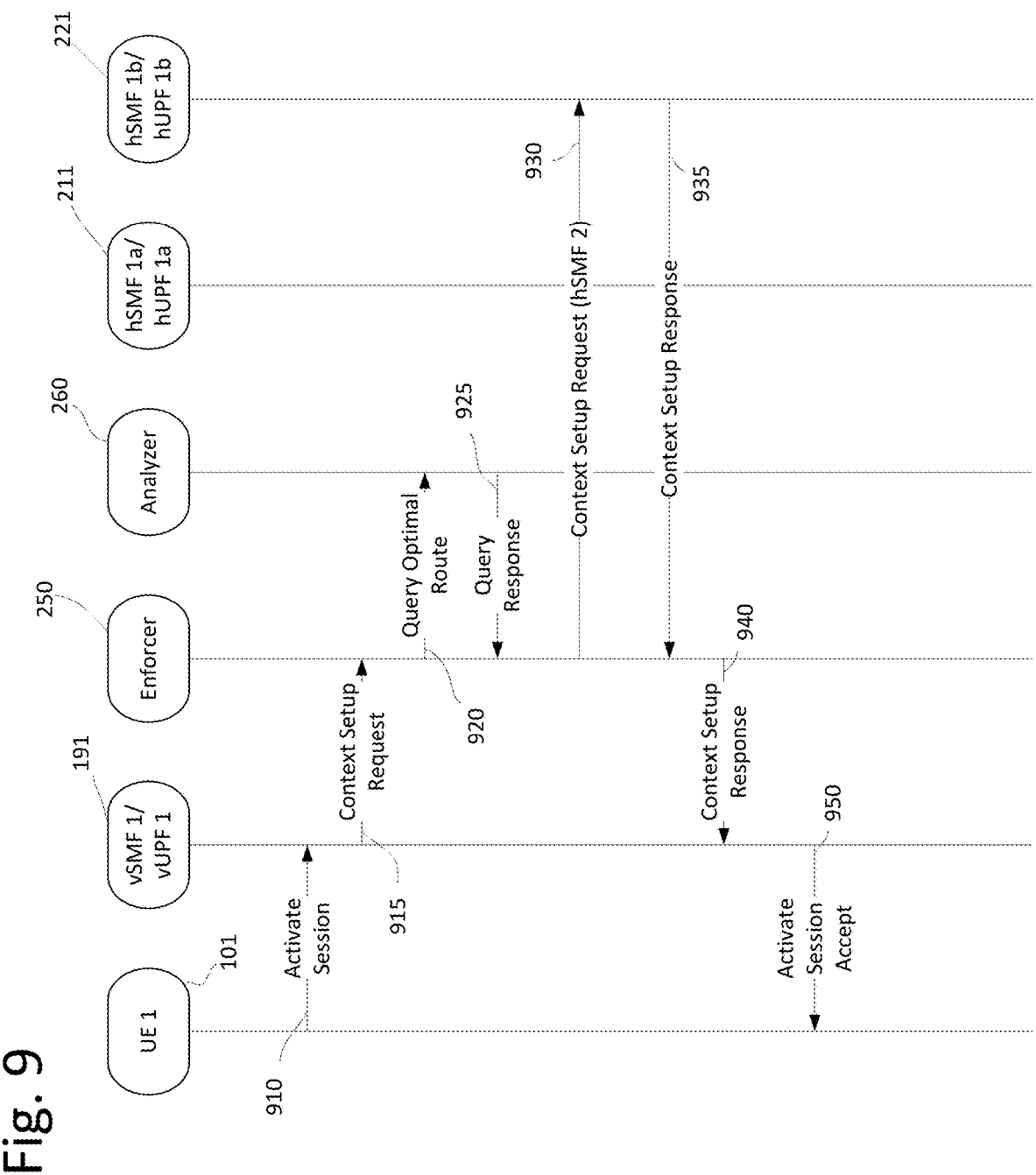
FIG. 9 is a sequential diagram depicting the home SMF/UPF selection procedure during session setup process in which the session is anchored at a different SMF/UPF based on the analyzer result.

FIG. 8 depicts an example of a signaling flow according to which GGSN/PGW is selected during data session setup. FIG. 8 illustrates that enforcer 250 queries 820 analyzer 260 to obtain the optimal route therefrom, which information is then used to send a GTP-C Create Session Request 830 toward the appropriate GGSN/PGW. Similarly, in FIG. 9, in the 5G Home Routed scenario, enforcer 250 queries 920 analyzer 260 to obtain the optimal routing path 925 including the appropriate home UPF/SMF 221 and sends Context Setup Request 930 toward that optimal UPF/SMF 221. Enforcer then receives a Context Setup Response 935 from the UPF/SMF 221 and sends Context Setup Response 940 to visited UPF/SMF 191, which activates session with UE 101.

Figure 10:
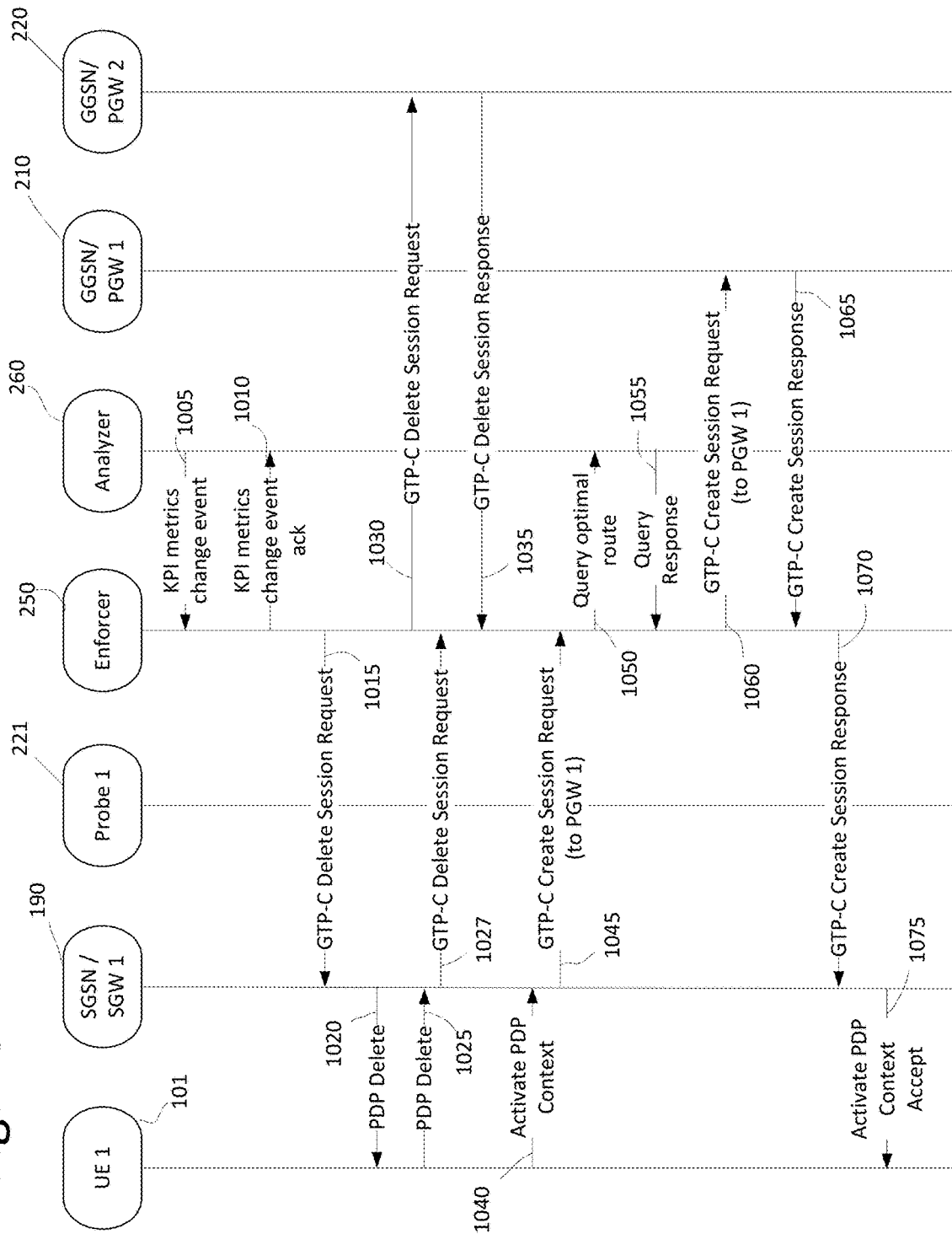
FIG. 10 is a sequential diagram depicting the PGW Reselection procedure when the analyzer notifies the KPI metrics change event towards the enforcer.

FIG. 10 depicts an example of a signaling flow for GGSN/PGW preselection when KPI metrics change. When enforcer 250 receives a KPI metrics change event message 1005 from analyzer 260, enforcer 250 sends GTP-C Delete Session Requests 1015/1030 toward SGSN/SGW 190 and then-current GGSN/PGW 220. Upon receiving a new GTP-C Create Session Request from SGSN/SGW 1045, enforcer 250 queries 1050 analyzer 260 for an updated optimal route and, upon receiving the response 1055 from analyzer 260, sends GTP-C Create Session Request 1060 toward the appropriate GGSN/PGW 210.

Figure 11:
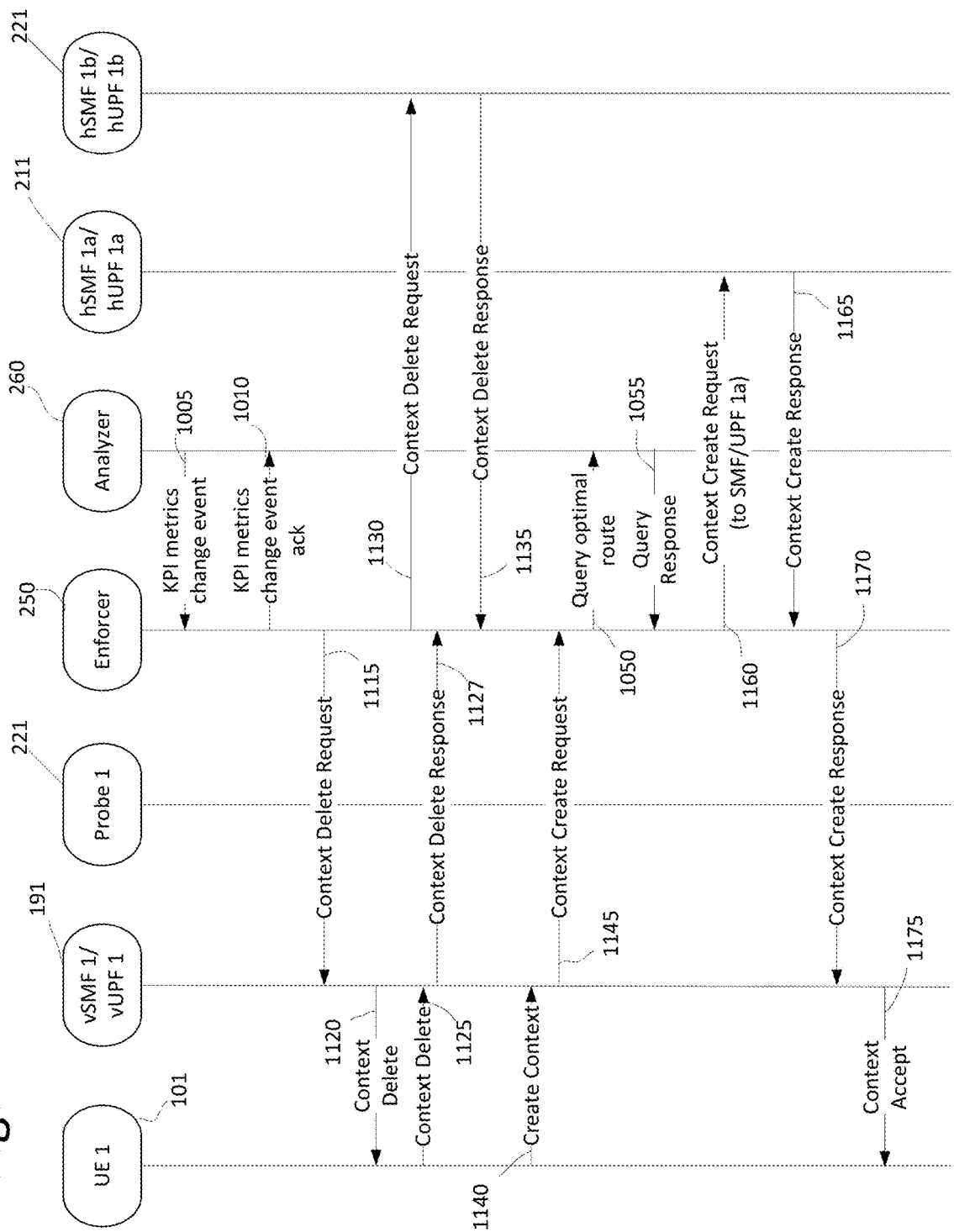
FIG. 11 is a sequential diagram depicting the home SMF/UPF reselection procedure when the analyzer notifies the KPI metrics change event towards the enforcer.

FIG. 11 depicts a signaling flow diagram from 5G Home Routed scenario. This scenario is similar to the one described above, except that instead of sending Context Delete Requests toward SGSN/SGW and GGSN/PGW, enforcer 250 sends Context Delete Requests 1115/1130 toward the visited 191 and home 211/221 SMF/UPFs and sends the new Context Create Request 1160 to the updated home SMF/UPF 211 indicated by analyzer 260.

Figure 12:
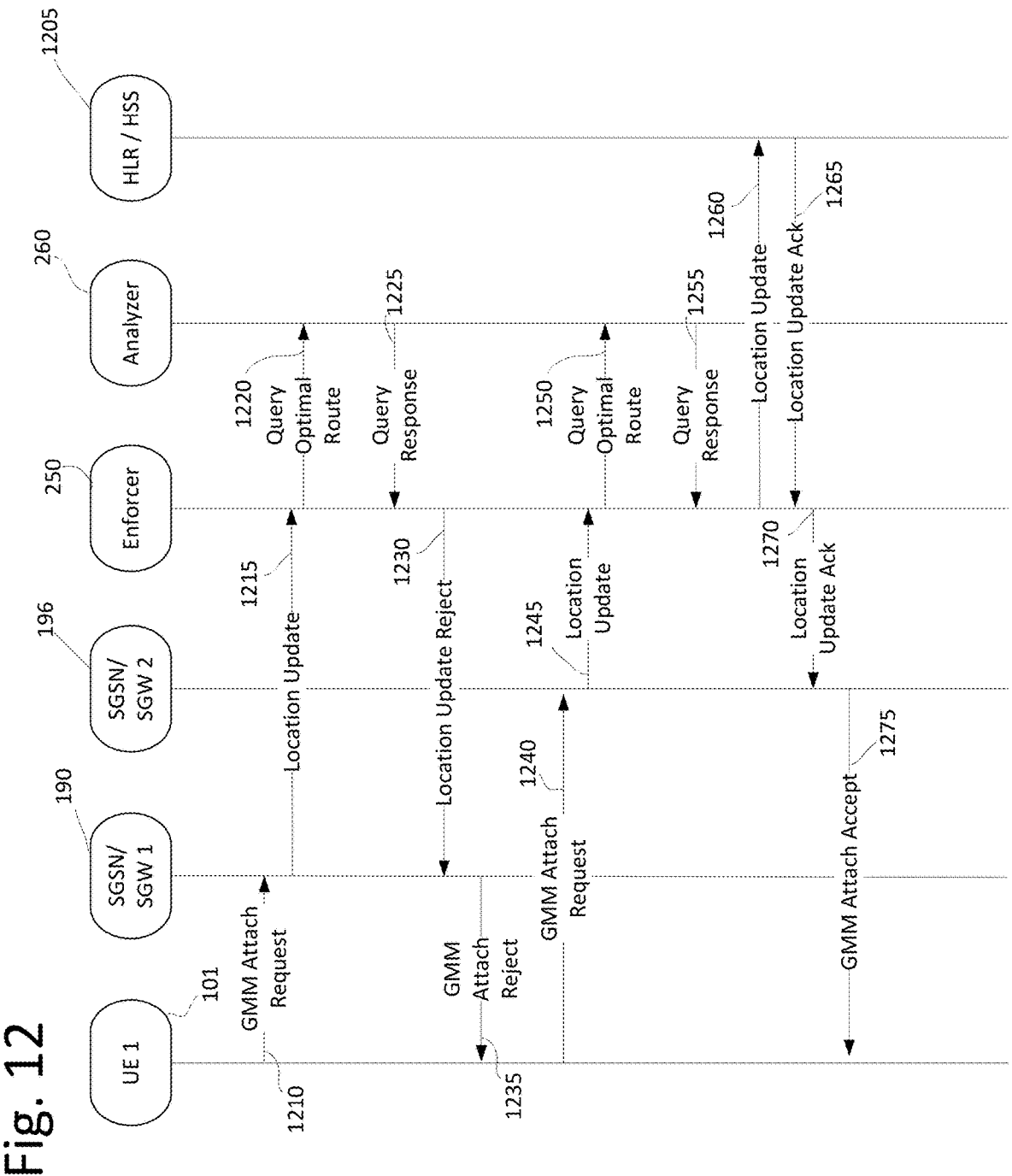
FIG. 12 is a sequential diagram depicting the SGW selection procedure during session setup process in which the session is anchored at a different SGSN/SGW based on the analyzer result.

FIG. 12 depicts a signaling flow for SGSN/SGW selection (either 190 or 196) procedure during data session setup. Responsive to receiving a Location Update (LU) message 1215 from the current SGSN/SGW 190, enforcer 250 queries analyzer 260 to determine whether the current SGSN/SGW 190 is optimal. Responsive to receiving a response indicating that the current SGSN/SGW 190 is not optimal, enforcer 250 rejects LU 1230 without sending it toward the HSS 1205. For a subsequent LU request 1245 from another SGSN/SGW 196, enforcer 250 again queries analyzer 260 to determine whether that SGSN/SGW 196 is optimal. If analyzer 260 confirms, enforcer 250 sends the LU message 1260 to the HSS 1205.

Figure 13:
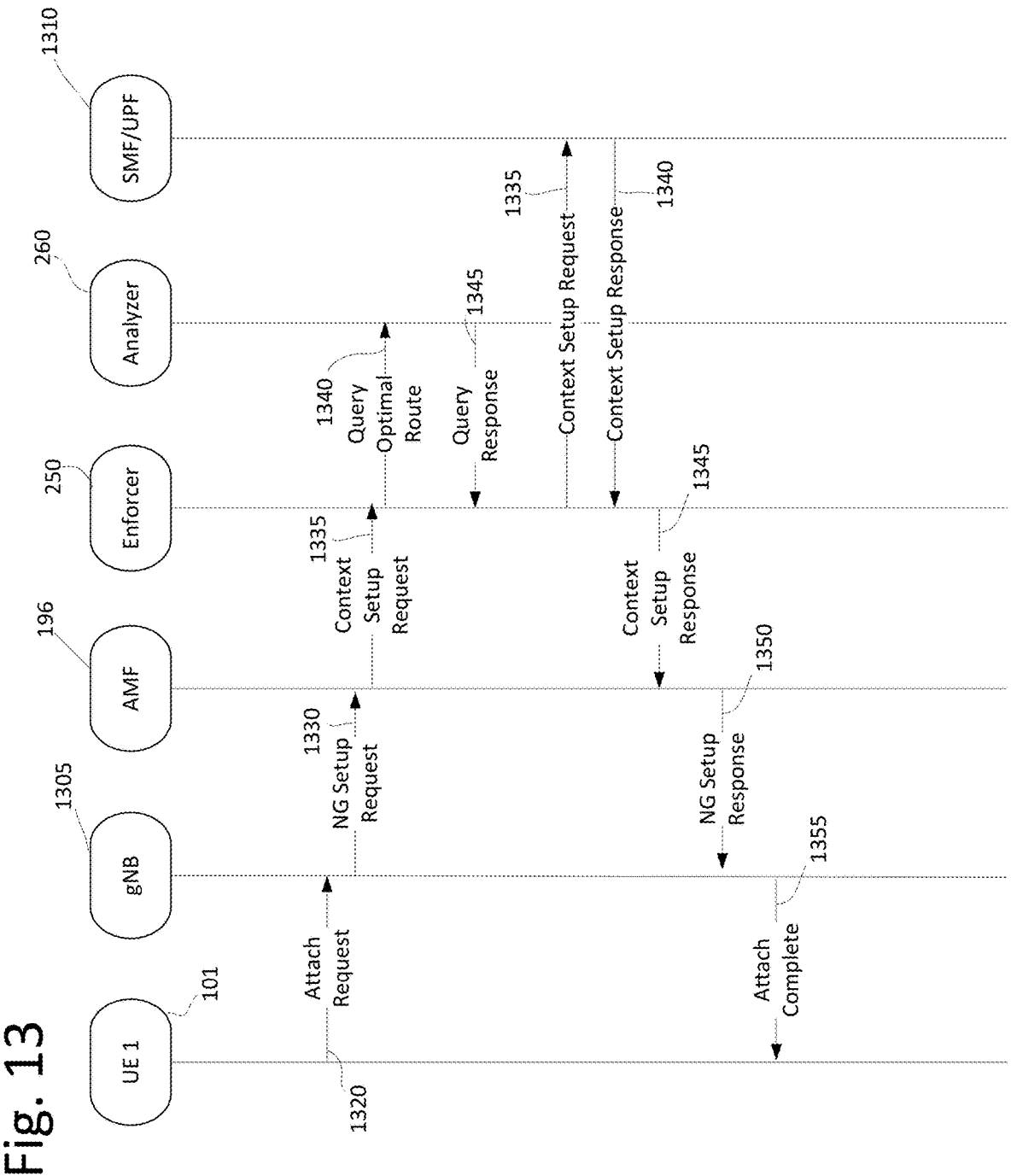
FIG. 13 is a gateway selection procedure for a non-roaming case in a 5G system where a particular SMF/UPF in the selected network slice is chosen based on the analyzer result.

FIG. 13 depicts a signaling flow diagram for Gateway selection during session setup in 5G Non-Roaming scenario. UE one 101 sends attach request 1320 to gNB 1305 which sends NG setup request 1330 to AMF 196. Enforcer 250 receives a context setup request 1335 from AMF 196 and then queries analyzer 260 for an optimal route 1340. Analyzer 260 responds 1345 instructing enforcer 250 to use SMF/UPF 1310. Enforcer 250 sends context setup request 1335 to SMF/UPF 1310 which responds 1340 back to enforcer 250. Enforcer 250 then relays a context setup response 1345 back to AMF 196 which sends NG setup response 1350 to gNB 1305. gNB 1305 finally sends attach complete message 1355 to UE one 101.

Figure 14:
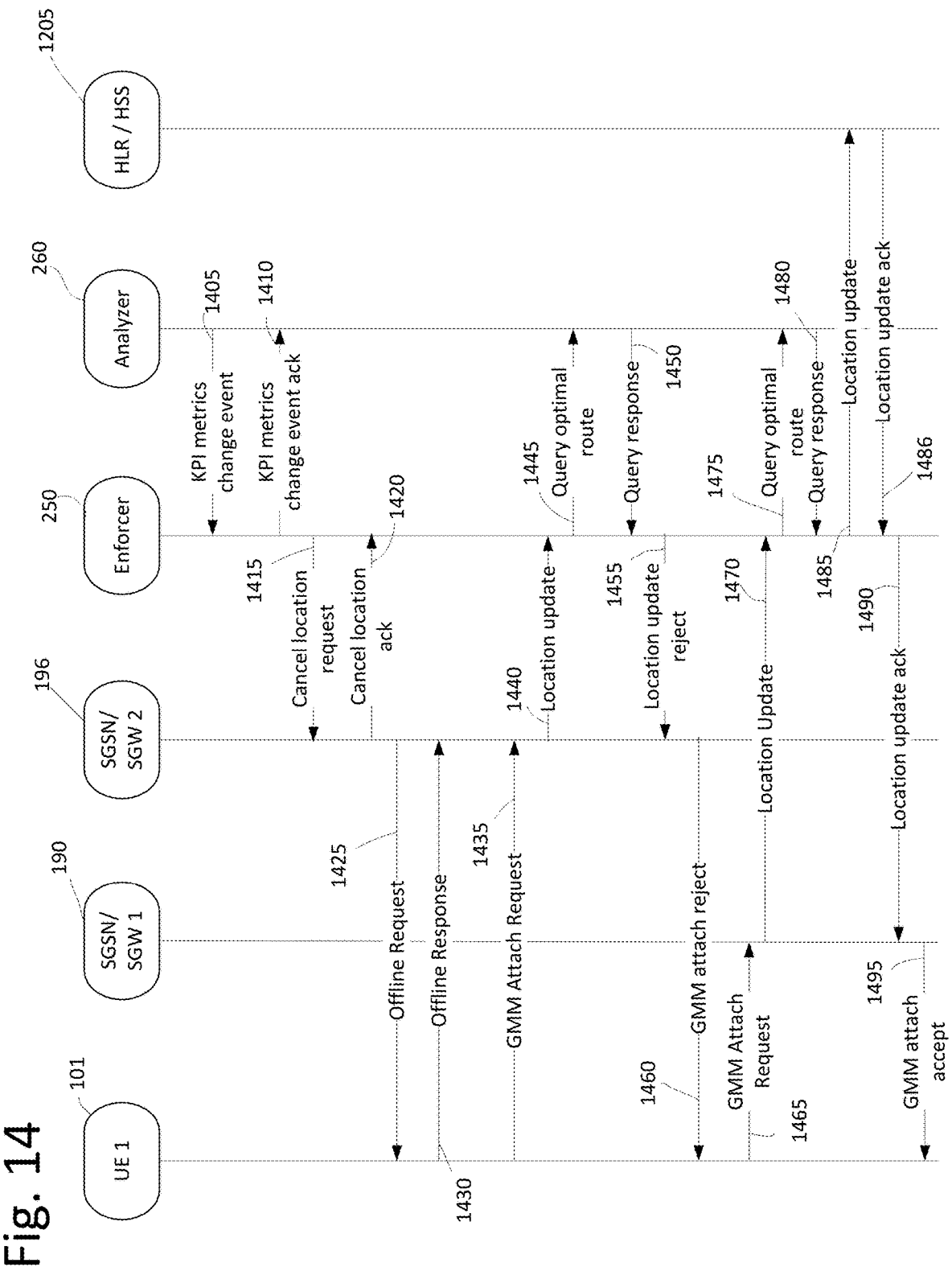
FIG. 14 is a sequential diagram depicting the SGW reselection procedure when the analyzer notifies the KPI metrics change event towards the enforcer.

FIG. 14 depicts a signaling flow diagram for SGSN/SGW re-selection when a network condition changes. Responsive to receiving a message 1405 from analyzer 260 indicating that KPI metrics have changed, enforcer 250 sends Cancel Location Request 1415 toward the current SGSN/SGW 196. Responsive to receiving a subsequent LU message 1470 from another SGSN/SGW 190, enforcer 250 queries 1475 analyzer 260 to determine whether that SGSN/SGW 190 is optimal. If analyzer responds in the negative, enforcer 250 sends LU Reject message 1455 to that SGSN/SGW 190. If analyzer 260, however, confirms 1480 that the SGSN/SGW 190 from which enforcer 250 received a LU message 1470 is optimal, enforcer 250 sends LU message 1485 toward the HSS 1205.

Figure 15:
FIG. 15 is a table diagram depicting the different KPI metrics and the different weights according to the application that forms the decision matrix for selecting the SGSN/SGW/Visited Network, GGSN/PGW, SMF/UPF and the Application Servers.

FIG. 15 depicts an example of a decision matrix used to determine the optimal routing path. Network performance indicators may include latency and packet loss. System capacity indictors may include network bandwidth availability, session amount, session load and application throughput. Session amount is the number of the concurrent GTP Session that the devices are consuming. The "session load" includes the total amount of sessions and the total bandwidth consumed by all the sessions. Cost indictors considered may include Inter-Operator Tariff (IOT), interconnect network costs, network costs and server hosting costs. These indictors and metrics may be weighted to determine optimal pathways to targets on the network include SGSN/SGW, GGSN/PGW, SMF/UPF and application servers. Furthermore, these indicators are for exemplary purposes. Other embodiment may include other KPIs such as the system load, network load that can be retrieved via SNMP probe or other mechanism.

The analyzer application implements machine learning algorithms that use the relevant data in the KPI metrics database to find the best gateway for the requested session, given the current conditions in the network when the session request is received.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

Glossary of Claim Terms

Access and Mobility Management Function (AMF) is a 5G network function relates to Termination of NAS signaling, NAS ciphering & integrity protection, registration management, connection management, mobility management, access authentication and authorization, security context management. The AMF performs most of the functions that the MME (mobility management entity) performs in a 4G network.

API stands for Application Programming Interface. An API is software that another application program employs to request and carry out lower level functions performed by an operating system or a software application. An API provides a uniform way to access functions, methods and procedures in another software system (either remote or local) by abstracting the underlying implementation and only exposing objects or actions the developer needs.

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Diameter is an authentication, authorization, and accounting protocol for computer networks.

Enhanced Data rates for Global Evolution (EDGE) means a technology that can be used in existing GSM and D-AMPS (IS-136) networks to increase the data capacity. EDGE is considered a pre-3G radio technology and is part of ITU's 3G definition.

External Gateway means a GGSN or PGW connection point on a GPRS network or a home network SMF or UPF on a 5G network.

Fifth Generation Network (5G) means the fifth-generation cellular network technology. It follows 2G, 3G and 4G and their associated technologies (such as GSM, UMTS, LTE, LTE Advanced Pro and others).

Gateway GPRS support node (GGSN) is the main component of the GPRS network and tasked with connecting the GPRS network with external packet switched networks (e.g., Internet or X.25). The GGSN is the anchor point that supports the mobility of the user terminal in the GPRS/UMTS networks. It is the GPRS equivalent to the home agent in Mobile IP. The GGSN maintains routing needed to tunnel the protocol data units (PDUs) to the SGSN that services a particular mobile station (MS).

Global System for Mobile Communication (GSM) means a wireless telecommunications standard for digital cellular services. It was developed by the European Telecommunications Standards Institute (ETSI) to describe the protocols for second-generation (2G) digital cellular networks used by mobile devices such as mobile phones and tablets.

General Packet Radio Service (GPRS) is a packet oriented mobile data standard on the 2G and 3G cellular communication network's global system for mobile communications (GSM).

GPRS Mobility Management (GMM) tracks where the subscribers are, allowing calls, SMS and other mobile phone services to be delivered to them.

GPRS Tunneling Protocol (GTP) is defined by 3GPP standards to carry General Packet Radio Service (GPRS) within 3G/4G networks.

GTP-C means a protocol within GTP for signaling between gateway GPRS support nodes (GGSN) and serving GPRS support nodes (SGSN). This allows the SGSN to activate a session on a user's behalf (PDP context activation), to deactivate the same session, to adjust quality of service parameters, or to update a session for a subscriber who has just arrived from another SGSN.

GTP-U means GTP user plane which is used for carrying user data within the GPRS network and between the core network and radio access network. The transport of user data in GTP-U is packetized in formats such as IPv4, IPv6 and PPP.

Heartbeat means a periodic signal generated by hardware or software to indicate normal operation of a computer system. Typically, a heartbeat query is sent between machines or network nodes at a regular interval in the order of seconds. If the endpoint node does not receive a heartbeat for a time—usually a few heartbeat intervals—the node that should have sent the heartbeat response is assumed to have failed.

High Speed Packet Access (HSPA) is a merger of two mobile protocols, High Speed Downlink Packet Access (HSDPA) and High-Speed Uplink Packet Access (HSUPA), that extends and improves the performance of existing 3G mobile telecommunication networks.

HLR means Home Location Register which is a database that contains subscription data about subscribers authorized to use the GSM core network. The HLRs store details of every SIM card issued by the mobile phone operator.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

HPMN means Home Public Mobile Network. The HPMN is the network from the operator by which a mobile subscriber has a subscription. The term is used in contrast to visited public mobile network (VPMN) which relates to roaming.

HTTP (Hypertext Transfer Protocol) means request-response application protocol which is the foundation of the World Wide Web in a client-server computing model. HTTP/2 is a revision of the HTTP network protocol.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

JavaScript Object Notation (JSON) means an open-standard data format using human-readable text.

Latency means the delay in data communications over a network. Latency is the wait time introduced by the data signal travelling the geographical distance as well as over the various pieces of communications equipment. Latency may be attributable to various factors including, but not limited to, signal propagation, transmission mediums, processing of packets and storage delays.

Long-Term Evolution (LTE) is a standard for wireless broadband communication for mobile devices and data terminals, based on the GSM/EDGE and UMTS/HSPA technologies.

Mobile application part (MAP) is an SS7 protocol used to access the home location register (HLR), visitor location register (VLR), mobile switching center and other components of a mobile network infrastructure.

Mobile device is a portable computing device connected to a wireless network such as a cellular phone, smart phone, or tablet device.

Mobile Operator (or MNO) means a wireless service provider, cellular company, wireless carrier, or mobile network carrier. An MNO is a provider of wireless communication services. The MNO owns or controls substantially all the elements necessary to sell and deploy services to customer subscribers including radio spectrum allocation, wireless network infrastructure, back haul infrastructure, customer care, billing, provisioning computer systems, marketing and repair departments.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Network Slice Selection Function (NSSF) is a function in a 5G network. It redirects traffic to a network slice instance to serve the user equipment. NSSF also determines the AMF set to serve the user equipment.

Packet Data Network Gateway (PGW) provides connectivity from the user equipment (UE) to external packet data networks by being the point of exit and entry of traffic for the UE. The PGW enacts policy enforcement, packet filtering for users, charging support and lawful interception as well as packet screening.

Packet Data Protocol (PDP) means a network protocol used by packet switching external networks to communicate with GPRS (General Packet Radio Services) networks. The PDP data structure exists on both the SGSN (Service GPRS Support Node) and the GGSN (gateway GPRS support node) that contains the mobile subscriber's session information while the session is active. When a mobile subscriber seeks to use GPRS, it must first attach and activate a PDP context. This assigns a PDP context data structure in the SGSN that the subscriber is visiting and the GGSN serving the subscriber's access point.

Parse means to search, separate or extract a subset of data from a first value to arrive at a second value. This may include fix-field extraction based on alphanumeric character position, searching for character strings or delimitators, or other form of syntax analysis.

Peer Network means a network accessible without traversing a centralized server.

Probe means a software application and/or hardware device inserted at a key juncture in a telecommunications network for the purpose of monitoring or collecting data about network activity.

Proxy means a server (a computer system or an application) that acts as an intermediary for requests from clients seeking resources from other servers.

REST or RESTful web services provide interoperability between computer systems on the Internet. REST stands for Representational State Transfer. A RESTful web service will make requests to a resource's URI that will respond in XML, HTML, JSON or other defined format. HTTP is the most common protocol for REST operations and use the HTTP verbs GET, POST, PUT, DELETE and the like.

Serving GPRS Support Node (SGSN) is a main component of the GPRS network, which handles all packet switched data within the network, e.g. the mobility management and authentication of the users. The SGSN keeps track of the location of an individual mobile subscriber and performs security functions and access control.

Serving Gateway (SGW) routes and forwards user data packets. The SGW manages and stores UE contexts, e.g. parameters of the IP bearer service, network internal routing information.

Serving Node means a SGSN or SGW connection point in a GPRS network or a SMF or UPF node in a 5G network.

Session Management Function (SMF) is a 5G function that performs the session management functions that are handled by the 4G MME, SGW-C, and PGW-C.

SIM (subscriber identity module) is an integrated circuit that stores the IMSI number, its related key and additional data.

Signaling System 7 (SS7) refers to a dedicated 64 kilobit data circuit to carry packetized messages about each call connected between machines of a network to achieve connection control.

Signal Transfer Point (STP) is a router that relays SS7 messages.

Mobile Telecommunications System (UMTS) is one of the third generation (3G) mobile telecommunications systems. It is a broadband, packet-based transmission of text, digitized voice, video, and multimedia at data rates up to 2 megabits per second (Mbps).

Universal Mobile Telecommunications System (UMTS) is a third-generation mobile cellular system for networks based on the GSM standard.

User Plane Function (UPF) is a function in a 5G network. The UPF performs packet routing and forwarding. It also performs packet inspection, QoS handling connects to the Internet POP (point of presence).

VLR means Visitor Location Register. VLR is a database storing data about mobile phones that recently joined a particular area of a mobile operator's network. The VLR keeps track of roamed mobile phone subscribers and communications with the HLR to determine whether the mobile phone is a permanent or temporary subscriber.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method of optimizing end-to-end routing in a cellular network, the method comprising the steps of:

communicatively coupling a probe to the cellular network, the probe having network authorization and authority to send and receive signaling messages to network peers selected from the group consisting of server gateways (SGW), packet data network gateways (PGW), gateway GPRS support nodes (GGSN), server GPRS support nodes (SGSN), session management function (SMF) nodes and user plane function (UPF) nodes;

the probe transmitting over a time-based interval an echo-request to a first network peer wherein the connection from the probe to the first network peer constitutes a first network path; the probe receiving from the first network peer an echo-response;

storing in a key performance indicator (KPI) metrics database at least one performance value for the first network path from the probe for the first network peer derived from the group consisting of latency, packet loss, network bandwidth, network availability, application throughput, network cost and hosting cost; the probe transmitting over the time-based interval an echo-request to a second network peer, the second network peer being a functionally equivalent node to the first network peer, wherein the connection from the probe to the second network peer constitutes a second network path; the probe receiving from the second network peer an echo-response;

storing in the KPI metrics database at least one performance value for the second network path from the probe for the second network peer derived from the group consisting of latency, packet loss, network bandwidth, network availability, application throughput, network cost and hosting cost;

responsive to a connection event, querying the KPI metrics database for an optimal network path based at least in part on the performance values for the first and second network paths;

receiving from the KPI metrics database, the optimal network path for a user equipment device;

generating a signaling message to force the user equipment device to reestablish its data connection to the received optimal network path; and transmitting the signaling message to the user equipment device.

2. The method of claim 1 wherein the connection event is a connection request message from the user equipment device, the connection request message received through a serving node on third generation (3G) and long-term evolution (LTE) networks.

3. The method of claim 1 wherein the echorequest is a GPRS tunneling protocol (GTP-C) message.

4. The method of claim 1 wherein the connection event is a connection request message from the user equipment device, the connection request message received through a serving node in a fifth generation (5G) network.

5. The method of claim 1 wherein the echo-request is a GPRS tunneling protocol (GTP-U) message.

6. The method of claim 1 wherein the connection event is a change in the KPI metrics database whereby the optimal network path for the user equipment device has changed.

7. The method of claim 1 wherein the probe generates heartbeat queries on a first interval to the network peers and stores heartbeat responses in the KPI metrics database.

8. The method of claim 7 wherein responsive to non-receipt of a heartbeat response based on a predetermined threshold timespan, the probe updating the KPI metrics database with the non-receipt and generating heartbeat queries on a second interval to the network peers, the second interval shorter than the first interval.

9. The method of claim 1 wherein the probe generates hypertext protocol (HTTP) GET requests to application servers within the cellular network and stores the HTTP responses in the KPI metrics database.

10. The method of claim 2 wherein the connection request message is an activate packet data protocol (PDP) context request received from the user equipment device through a first serving node as a first GTP-C create session request message to connect to a first external gateway, the method further comprising:
   querying the KPI metrics database;
   identifying a second external gateway having a higher performance value than the first external gateway;
   issuing a second GTP-C create session request to the second external gateway;
   receiving a GTP-C create session response from the second external gateway; and
   transmitting a GTP-C create session response to the first serving node which then transmits an activate PDP context accept message to the user equipment device whereby the user equipment device connects to the higher-performing second external gateway.

11. The method of claim 4 wherein the connection request message is an activate session request received from the user equipment device through a first serving node as a context setup request message to connect to a first external gateway, the method further comprising:
   querying the KPI metrics database;
   identifying a second external gateway having a higher performance value than the first external gateway;
   issuing a context setup request to the second external gateway;
   receiving a context setup response from the second external gateway; and
   transmitting a context setup response to the first serving node which then transmits an activate accept message to the user equipment device whereby the user equipment device connects to the higher-performing second external gateway.

12. The method of claim 2 wherein the connection request message is a GPRS Mobility Management (GMM) attach request received from the user equipment device through a first serving node as a first location update message, the method further comprising:
   querying the KPI metrics database;
   identifying a second serving node having a higher performance value than the first serving node; and
   issuing a location update reject message back to the first serving node and signaling to the user equipment device to generate a GMM attach request to the second serving node whereby the user equipment device connects to the higher-performing second serving node.

13. The method of claim 9 wherein the connection request message is a HTTP request received from the user equipment device through a first serving node to a first application server, the method further comprising:
   querying the KPI metrics database;
   identifying a second application server having a higher performance value than the first application server; and
   signaling to the user equipment device to update the uniform resource locator from the first application server to the second application server whereby the user equipment device connects to the higher-performing second application server.

14. A system of optimizing end-to-end routing in a cellular network, the system comprising:
   a probe software application communicatively coupled to the cellular network, the probe having network authorization and authority to send and receive signaling messages to network peers selected from the group consisting of server gateways (SGW), packet data network gateways (PGW), gateway GPRS support nodes (GGSN), server GPRS support nodes (SGSN), session management function (SMF) nodes and user plane function (UPF) nodes;
   the probe transmitting over a time-based interval an echo-request to a first network peer wherein the connection from the probe to the first network peer constitutes a first network path;
   the probe receiving from the first network peer an echo-response;
   storing in a key performance indicator (KPI) metrics database at least one performance value for the first network path from the probe for the first network peer derived from the group consisting of latency, packet loss, network bandwidth, network availability, application throughput, network cost and hosting cost;
   the probe transmitting over the time-based interval an echo-request to a second network peer, the second network peer being a functionally equivalent node to the first network peer, wherein the connection from the probe to the second network peer constitutes a second network path;
   the probe receiving from the second network peer an echo-response;
   storing in the KPI metrics database at least one performance value for the second network path from the probe for the second network peer derived from the group consisting of latency, packet loss, network bandwidth, network availability, application throughput, network cost and hosting cost;
   providing an analyzer application communicatively coupled to the cellular network and KPI metrics database, the analyzer containing logic to identify optimal end-to-end network pathways;
   responsive to a connection event, querying the KPI metrics database for an optimal network path based at least in part on the performance values for the first and second network paths;
   returning the query results to the analyzer whereby the optimal end-to-end network pathway is identified by the analyzer;
   providing an enforcer application communicatively coupled to the cellular network and analyzer, the enforcer generating a signaling message to force a user equipment device to reestablish its data connection to the optimal network path identified by the analyzer;
   and the enforcer transmitting the signaling message to the user equipment device whereby the user equipment device reestablishes its data connection to the optimal network path.

15. The method of claim 14 wherein the system intercepts signaling messages from one or more network peers on the cellular network, checks the messages against the KPI metrics database to determine if the messages establish or maintain an optimal network path and responsive to the analyzer determining a better network path is available, the enforcer generates signaling messages directed to the user equipment device to reestablish its data connection to the optimal network path.

16. The method of claim 14 wherein the system monitors the KPI metrics database for changes in the optimal network pathways and responsive to such changes, invokes the enforcer to generate signaling messages directed to the user equipment device to reestablish its data connection to the newly identified optimal network path.

17. The method of claim 16 wherein the KPI metrics database is polled at an interval between 5 and 60 minutes for changes in the optimal network pathways.

18. The method of claim 16 wherein the enforcer will generate a signaling message to direct to the user equipment device to reestablish its data connection to a new network path only if a threshold performance improvement delta exists.

19. The method of claim 15 wherein the signaling messages generated by the enforcer are selected from the group consisting of global system for mobile communication (GSM), mobile application part (MAP), Diameter, GTP-C and JavaScript object notation.

20. The method of claim 14 wherein the user equipment latency information is retrieved from deep packet inspection.

* * * * *